W. GREEN.
WATER AND STEAM COCK AND VALVE.
APPLICATION FILED NOV. 25, 1913.
1,119,948. Patented Dec. 8, 1914.
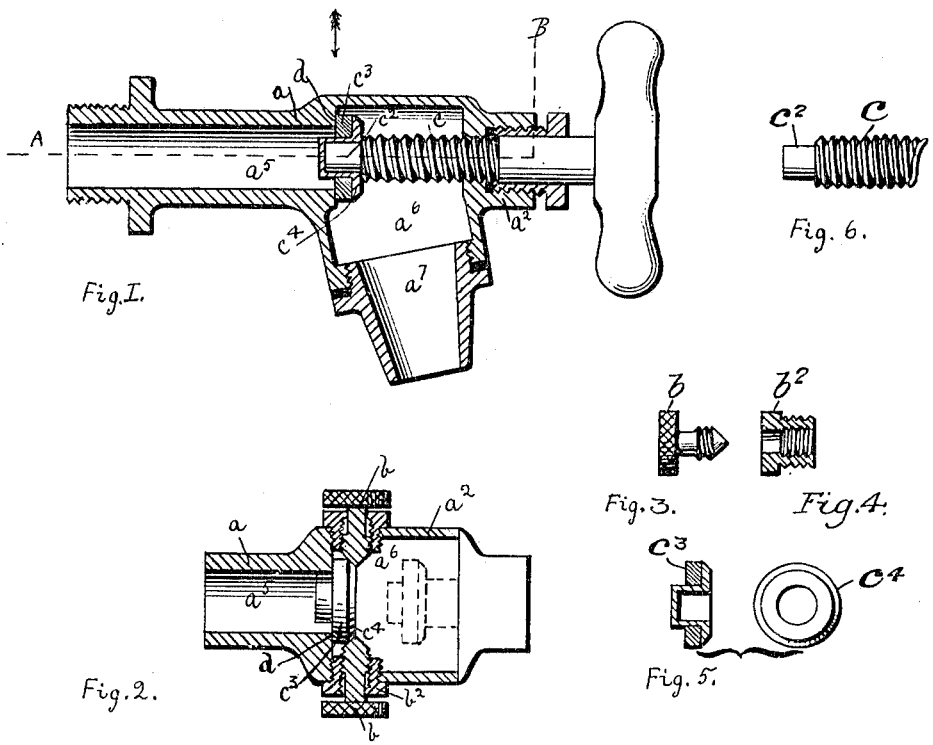

UNITED STATES PATENT OFFICE.

WILLIAM GREEN, OF LONDON, ENGLAND.

WATER AND STEAM COCK AND VALVE.

1,119,948. Specification of Letters Patent. Patented Dec. 8, 1914.

Application filed November 25, 1913. Serial No. 803,010.

*To all whom it may concern:*

Be it known that I, WILLIAM GREEN, a British subject, residing at 6 Meredith street, London, E. C., in the county of London and Kingdom of Great Britain, have invented a new and useful Water and Steam Cock and Valve, of which the following is a specification.

My invention relates to improvements in water and steam cocks or valves.

The present invention provides means whereby a new washer or valve may be inserted before the old is withdrawn, and without removing the stop cock or shutting down steam or in any other manner interfering with the supply. I attain these objects by the mechanism illustrated in the accompanying drawing, in which, Figure 1. is a section of a bib cock with the valve held against its seating by the valve stem thereby closing the "way" therethrough, Fig. 2. is a sectional plan on the line A. B. of Fig. 1, (looking in the direction of the arrow,) with the valve stem withdrawn and the washer held against its seating by two screws, the same figure showing by dotted lines the new washer in position on the valve stem, after insertion, and the disposition of the two washers relatively, the screws, their construction, and the manner in which they are operated to become effective being hereinafter fully described. Fig. 3. shows a screw and Fig. 4. shows a nut or bush used in connection with the said screw. Fig. 5. is a section of a thimble with a washer and Fig. 6 is a detail view of the inner end of the plunger upon which the said thimble fits.

Similar letters refer to similar parts throughout the drawing.

In the Fig. 1, a screw down valve stem $c$, working through a threaded hole and a gland in the cock body $a^2$ of the cock $a$, works opposite to and in line with the line of bore $a^5$ as shown. It has its inner end $c^2$ turned smaller than its body $c$ to form a shank upon which is placed the washer or valve $c^3$. The washer disk $c^3$ consisting of rubber steel, gun metal or other suitable material is fitted on to a thimble $c^4$ the bore of the thimble sliding on to the shank $c^2$ of the plunger $c$. The thimble $c^4$ has a shoulder on it against which the washer disk $c^3$ fits closely. The back edge of the shoulder of the thimble $c^4$ is chamfered or splayed and the back face may have two grooves in it placed opposite each other. Two set screws $b$ Fig. 2, placed opposite each other are screwed into the chamber or cock body $a^2$ the ends, preferably coned, passing beyond the inner wall. These screws are made long enough to screw in and press against the outside edge of the thimble $c^4$ or engage with the grooves if such grooves are formed when the washer $c^3$ is closed on to a seating $d$ intermediate between the inlet $a^5$ and outlet $a^6$. The screw $b$ is adapted to work in a threaded nut or bush $b^2$ the nut or bush being preferably made longer than the threaded part of the screw $b$ which enables the screw to advance or retract when it (the screw) is rotated. The outer end of the nut or bush $b^2$ has its bore reduced thus forming a wall the inner part of the reduced bore being coned to form a seating. The outer part of the screw $b$ is reduced to form a shank and is also coned to fit the seating of $b^2$ so that on screwing out the set screws clear of the path of the washer $c^3$ (their normal position) the seating of $b$ closes on to the seating of $b^2$ thus making a liquid or vapor tight joint and furthermore, it so acts that the more the set screws are screwed outward the more effective is made the joint. I may, if desired, place a washer on the seating of $b$ to aid me in obtaining a good joint. The set screw $b$ is fed into the nut or bush $b^2$ from the shank end (before the nut or bush is screwed into the cock body $a^2$) and a milled edge disk is fitted (by means of a square or thread on the shank) on to the screw $b$ the shank being riveted over or pinned to prevent the disk coming off. The nut or bush $b^2$ is then screwed into the cock body $a^2$ and the joint sealed by a washer or other suitable means. A nozzle $a^7$ Fig. 1. is screwed into or on to the underneath part of the cock body $a^2$ of the cock $a$. The threaded end of the nozzle may be recessed. When it is required to insert a new washer assuming the cock to be in use on a water or steam supply, the "way" is closed by screwing down the valve stem bringing the washer $c^3$ against its seating $d$. The set screws $b$ are screwed in tight against the back face of the thimble $c^4$ thus allowing the valve stem to be screwed out while effectively maintaining the "way" closed. The nozzle is then taken off and a thimble and washer inserted through the aperture $a^6$ and fed on to the small end $c^2$ of the plunger $c$. The nozzle is screwed on again the old thimble and washer are released (by screwing outward the two screws $b$) and are carried downward into the nozzle by the flow of water or steam. The ordinary action of shutting off the water or steam is then performed after which the old washer can be taken from the nozzle. When a screw off outlet is used the washer falls into the outlet the nozzle being dispensed with.

In a cock having the improvements as aforesaid, the means for holding the valve closed when the valve stem is withdrawn (to receive a new thimble washer on its small end) is positive in consequence of the screws $b$ being made to abut on to the back edge of the thimble $c^4$ thus enabling my invention to be of use in water or steam cocks used on either high or low pressure supplies.

I claim:

In a cock, the combination of a body, a reciprocating stem having a reduced inner end, a removable thimble $c^4$ carrying a valve $c^3$ slidably mounted on said reduced inner end and arranged in the passageway of the body intermediate the inlet $a^5$ and outlet $a^6$, two set screws $b$ located opposite each other within the cock body and adapted to removably engage the back face of said thimble and a removable nozzle $a^7$ located below the outlet and screwing into the cock body, substantially as described.

Dated this eleventh day of November 1913.

WILLIAM GREEN.

Witnesses:
I. TORRING KELLICK,
C. A. WALLACE.

Copies of this patent may be obtained for five cents each, by addressing the "Commissioner of Patents, Washington, D. C."